United States Patent Office 3,527,562
Patented Sept. 8, 1970

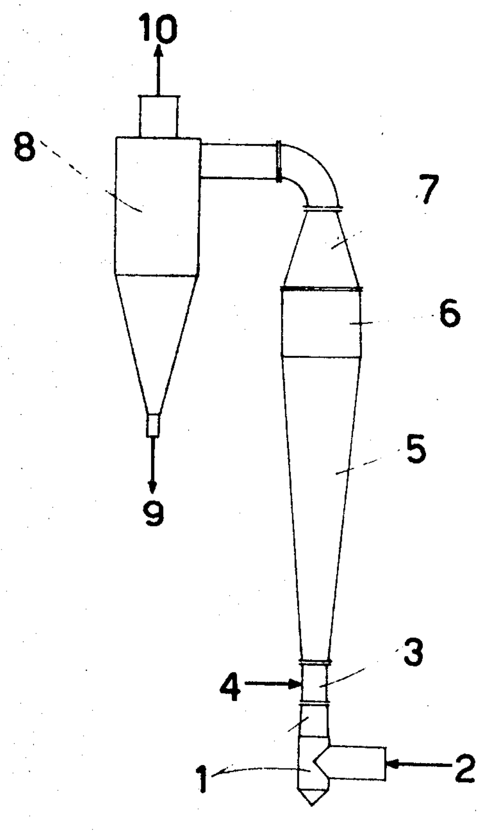
10
8
7
6
5
9
3
4
2
1

1

3,527,562

PROCESS AND APPARATUS FOR THE PRODUCTION OF SUPERPHOSPHORIC ACID

Marco Olper, Siracusa, Italy, assignor to SINCAT—Societa Industriale Catanese S.p.A., Palermo, Italy Continuation of application Ser. No. 559,130, June 21, 1966. This application Aug. 13, 1969, Ser. No. 850,344
Claims priority, application Italy, June 18, 1965, 13,716/65
Int. Cl. C10b *25/24*
U.S. Cl. 23—165 5 Claims

ABSTRACT OF THE DISCLOSURE

A process for the preparation of superphosphoric acid by direct heat exchange, comprising establishing an ascending stream of gaseous drying medium of upwardly decreasing velocity and temperature; introducing an aqueous solution of orthophosphoric acid into the said gaseous stream at a zone thereof of relatively high tempearture, whereby said aqueous solution of orthophosphoric acid is subdivided into a state of minute droplets, which droplets are progressively upwardly carried by the gaseous stream into zones of decreasing velocity and temperature until upward movement thereof ceases and there is formed a static dimensionally-stable fluidized bed of aqueous orthophosphoric acid droplets dehydrating to superphosphoric acid, at which level dehydration continues to the desired extent and such that the further dehydrated droplets comprising superphosphoric acid are again carried upwardly by the gaseous stream to a progressively higher level; and thence separating the gaseous stream and the droplets comprised of superphosphoric acid exhibiting the desired degree of concentration.

This application is a continuation of Ser. No. 559,130, filed June 21, 1966, and now abandoned.

The present invention relates to the production of superphosphoric acid and to apparatus for effecting this.

Superphosphoric acid is a mixture of orthophosphoric acid and various other condensed phosphoric acids, in particular pyrophosphoric acid and other polyphosphoric acids. The $P_2O_5$ content of superphosphoric acid generally ranges from 68% to 76% by weight (Fertilizer Technology and Usage—1963, p. 141).

Superphosphoric acid can be obtained from phosphorus by combustion. Phosphorus is reacted with air oxygen and the combustion gases are reacted with a limited amount of water appropriate to give directly a mixture of acids with the required $P_2O_5$ content, generally 70% to 76% by weight. This process is not very appropriate when superphosphoric acid of high purity is not required, for example as in some fertilizer applications.

Superphosphoric acid can be also obtained by dehydration of orthophosphoric acid. This dehydration can be carried out by direct or indirect heat exchange with hot gases or superheated steam.

The dehydration of orthophosphoric acid by direct heat exchange, carried out for example by submerged burners, involving locally very high temperatures, results in high losses of $P_2O_5$ in the fog carried by the outgoing gases. The precipitation of such fogs is very difficult and expensive.

The relatively long dwell, of about 10–20 minutes, of the acid in the dehydration plant, whether direct or indirect heat exchange is used, can give rise to the formation of particular types of iron and/or aluminum polyphosphates, probably cyclic and/or long chain compounds, which are not soluble in water or acids. Their formation

2 represents an equivalent loss of $P_2O_5$. Additionally they cause a detrimental increase in the viscosity of the superphosphoric acid.

An object of this invention is to provide a process for producing superphosphoric acid by dehydration of an aqueous solution of orthophosphoric acid, particularly one obtained by a wet process, by direct heat exchange between the solution and hot gases, which permits a very high thermal efficiency.

A further object of the present invention is to provide a process for producing superphosphoric acid by dehydration of aqueous solutions of orthophosphoric acid by direct heat exchange with hot gases, which affords high $P_2O_5$ yield, avoiding the production of $P_2O_5$ containing fog.

Another object of this invention is to provide a process for producing superphosphoric acid by dehydration of aqueous solutions of orthophosphoric acid by direct heat exchange with hot gases, which permits working at temperatures lower than those required by other such processes, with consequential reduction of corrosion whilst permitting the use of cheaper materials in the construction of the respective apparatus.

Still another object of this invention is to provide for carrying the dehydration out in a very short time in order to achieve very high plant capacity and to avoid the formation of insoluble polyphosphates.

Yet another object of this invention is to provide apparatus suitable for effecting the dehydration, having a very simple construction, permitting very easy maintenance and particularly low price.

According to the invention, aqueous orthophosphoric acid is dispersed into a rising and widening stream of hot gas under condition engendering a distinct fluidized bed of acid droplets from which smaller droplets or particles of superphosphoric acid are entrained in the continuing stream of the hot gas.

Suitably the hot gases, having a temperature ranging from 250° C. to 1100° C. are conveyed to the lower part of a substantially vertical conduit which includes:

(1) a lower part provided with an inlet for said gases,
(2) a restriction located above the gas inlet and
(3) a gradually widening section located above the restriction.

Preferably it is arranged that the hot gases rise at a speed between 20 and 100 m./sec. during their travel through the restriction. The solution of orthophosphoric acid is introduced into the conduit in or near the restriction so that it is subdivided into droplets by and entrained in the gas stream. In the widening section of the conduit a level is reached where the reduced gas velocity permits the establishment of a fluidized bed of droplets wherein dehydration of the orthophosphoric acid proceeds. The resulting smaller and/or lighter particles of superphosphoric acid are entrained by the gas stream above the fluidized bed and, on leaving the conduit are separately collected.

The restriction in the conduit has the effect of imparting a maximum upward speed to the hot gas flow in a way that the gas subdivides the solution fed into the restriction in minute droplets and entrains them. Beyond the restriction because of the increase of the cross-section of the conduit, the gas speed gradually decreases until it reaches a value corresponding to the conditions under which a stable fluidized bed of droplets is formed. In this fluidized bed, the droplets undergo a very intense contact with the gas in a way that the orthophosphoric acid solution dehydrates in a very short time and the superphosphoric acid droplets are lifted up by the gas, from which they can easily be separated when they have left the conduit. Thermal balance of the gas-liquid mixture is reached within a very short time, as the hot gas remains for only a few tenths of a second in contact with the liquid.

The accompanying drawing shows a longitudinal cross-section of an apparatus for carrying out the process of this invention.

The illustrated apparatus comprises:

(1) a lower part 1 provided with a gas inlet zone 2,
(2) a restriction 3 in which at point 4 the orthophosphoric acid solution is introduced,
(3) a gradually enlarging section 5, having substantially the shape of a truncated cone; the cross-section of this section is generally elliptical.

The truncated conical section 5 may be surmounted by a further section 6 with constant cross-section which allows the dwell of the gases in the vessel to be increased without diminishing the gas speed at the outlet. The vessel may at its top part terminate with a progressive restriction 7 by which the outlet gas speed can be increased: the separation of the droplets from the gas is thus made easier in case an apparatus, as for example a cyclone separator which works at higher efficiency with higher speed of the incoming gases, is used for separation.

The restriction 3 is positioned at some distance above the gas inlet 2 in order to allow the gases to assume a uniform upward movement before reaching the restriction.

The vessel is dimensioned in accordance with the gas flows so that the gas speed, in the restriction 3, ranges from 20 to 100 m./sec.; and at a point of the section 5 has a speed suitable for the establishment of a fluidized bed of droplets.

To promote a uniform gas flow, all sections of the vessel preferably have an elliptical cross-section. When the section 5 has a circular cross-section, the included angle preferably ranges from 3° to 20°. When the cross-section is acircular, the angularities are preferably such that the cross-section increase with height is substantially the same as for a cone with an included angle (in a diametrical section) of from 3° to 20°.

Preferably all parts of the vessel have a substantially circular cross-section and the included angle of the truncated cone section 5 is from 6° to 9°.

A type of vessel particularly suitable for carrying out the process of this invention is a Venturi tube with its diffuser turned upward and optionally equipped with a surmounting element 6 of constant cross-section and with a decreasingly cross-sectioned tube 7, as illustrated in the accompanying drawing.

Air heated in a combustion chamber can be used as hot gas source. The temperature at which gases are to be heated obviously depends on the orthophosphoric acid concentration, the feed rate of the solution and the required $P_2O_5$ content in the dehydrated product. The more dilute the orthophosphoric acid solution is, the higher the temperature of inlet gas must be. Under some conditions of solution concentration and flow, the content of $P_2O_5$ in the superphosphoric acid will be the higher, the higher the temperature of the incoming gases.

The temperature of the inlet gases is variable within a wide range. Good results can be already achieved by means of gases with relatively low tempeartures, for example of the order of 250° C. Good results can also be obtained with gases having very high inlet temperatures, for example of the order of 1100° C., as well as at any intermediate temperature. It is however better to limit the temperature of the inlet gases in a way to avoid the establishment of $P_2O_5$ fogs in the outlet gases: this generally involves limiting the incoming gas temperatures to 700° C. As consequence of the excellent thermal efficiency still assured by the process at temperatures lower than 700° C., it is possible to avoid all problems connected with the precipitation of such fogs. It is preferred to use inlet gas temperature from 550° C. to 700° C.

The preferred gas speed within the restriction is from 50 to 70 m./sec.

The preferred concentration of the orthophosphoric acid feed is not less than 45% of $P_2O_5$ by weight. Under such process conditions, the heat exchange reaches peak efficiency.

After setting the inlet gas temperature and the solution concentration, by adjusting the feed, the whole range of concentrations between 68% and 72% of $P_2O_5$ by weight can be covered.

The separation of the superphosphoric acid droplets involves no problem. It can be carried out using techniques commonly applied for separating a liquid phase from a gas suspending it. Excellent results are achieved by means of cyclones separators or plenum chambers.

The temperature of the superphosphoric acid leaving the conduit is relatively low, as it ranges from about 170° C. to 200° C. for $P_2O_5$ contents of 68% to 72% by weight.

The extreme rapidity of the dehydration process permits high output to be reached with an apparatus of small size. Considering also the extremely simple construction of the apparatus, the cost of a plant of predetermined capacity is remarkably lower than for those of conventional construction. The highest operation simplicity and maintenance ease are further advantages of the process and apparatus of this invention. Because of the simplicity of the process, it can easily undergo automation.

The gases leaving the conduit have generally a temperature of 200° C. to 280° C. Their water content is limited. This is due to the thermodynamical features of the dehydrating reaction of orthophosphoric acid. The gas maintains therefore a high evaporation capacity. It can therefore, according to a further feature of the invention, be used for the preliminary concentration of the starting orthophosphoric acid solution. Starting for example from an orthophosphoric acid solution at 30% of $P_2O_5$ by weight, it is possible to concentrate it by means of said gases up to a 50% content of $P_2O_5$ by weight.

Another application of the same applicant, Ser. No. 558,754, filed June 20, 1966, and now abandoned, describes a process broadly similar to that described herein, but directed generally to the concentration of aqueous solutions and suspensions. The exit gases (freed from superphosphoric acid) of a process according to the present invention, can be used as the hot inlet gas for a process according to our above-mentioned application, especially for the preliminary concentration of orthophosphoric acid.

Thus, hot gases are used to convert concentrated orthophosphoric acid into superphosphoric acid in a first apparatus. This superphosphoric acid is collected for example in a cyclone separator.

The residual gases then concentrate a dilute orthophosphoric acid in a second apparatus, to make the concentrated orthophosphoric acid in an analogous fashion, for feeding to the first apparatus. The advantages of both processes are in this way integrated and the heat of the starting gases is exploited almost entirely. The separation of the superphosphoric acid does not need to be carried out exhaustively, as small residual quantities of superphosphoric acid entrained by the exit gas are recovered in the second apparatus. One efficient precipitation operation only is therefore necessary, at the initial concentration stage outlet.

Starting for example from phosphoric acid with 30% of $P_2O_5$ by weight, this acid can be concentrated up to 45% to 50% of $P_2O_5$, for example, at the concentration stage, and converted into superphosphoric acid of 68% to 70% $P_2O_5$, for example, at the dehydration stage.

The following examples illustrate how the invention can be carried out into effect.

EXAMPLE NO. 1

This example describes the production of superphosphoric acid starting from a $H_3PO_4$ solution at 52.5% $P_2O_5$ strength, obtained by a wet process and subsequently concentrated.

The dehydration apparatus consists of a vertical Venturi tube as shown in the accompanying drawing, with a restriction of 214 mm. bore, 500 mm. high. The diffuser has an included angle of 7°. A section with a constant 500 mm. diameter and a section with decreasing diameter surmount the diffuser.

The superphosphoric acid is separated from gases by means of cyclone separator 8 and collected at outlet point 9, while the gases leave cyclone at 10.

The orthophosphoric acid solution, having a temperature of about 70° C., is fed at the restriction 3 at a flow rate of about 890 kg./h.

Air, heated to about 600° C., is fed at a rate of about 2250 nmc./h. The velocity of the air at the restriction is about 55 m./sec. and about 6 m./sec. at the outlet from the diffuser.

680 kg./h. about of superphosphoric acid are discharged by the cyclone, having this acid a total $P_2O_5$ content of about 68.5% by weight and a non-orthophosphoric $P_2O_5$ content of about 35% by weight.

EXAMPLE NO. 2

This example describes the production of superphosphoric acid starting from $H_3PO_4$ solution containing 55,2% by weight of $P_2O_5$ obtained by a wet process and subsequent concentration.

The orthophosphoric acid solution, at about 80° C. is fed into the restriction of the apparatus, described in Example No. 1, at a rate flow of about 900 kg./h. The heated air has a temperature of about 645° C. and flow of about 2195 nmc./h.

About 690 kg./h. of superphosphoric acid having a total $P_2O_5$ content of 71.9% about and a non-orthophosphoric $P_2O_5$ content of about 40% by weight, are discharged from the cyclone separator.

EXAMPLE NO. 3

This example describes the production of superphosphoric acid starting from a $H_3PO_4$ solution with about 30.2% of $P_2O_5$ obtained by a wet process.

Dehydration and concentration are performed in two Venturi tubes in series through which the same flow of hot gases passes. These tubes have same constructional features and dimensions as the one specified in Example No. 1, and each is connected with a cyclone separator.

The first Venturi tube is fed by air heated at 650° C. about at a flow rate of about 2300 nmc./h. The concentrated orthophosphoric acid collected in the separator connected with the second Venturi tube is fed to the restriction of the first Venturi tube. About 345 kg./h. of superphosphoric acid having a $P_2O_5$ content of about 70% cc./m. by weight and a non-orthophosphoric content as $P_2O_5$, of about 40% by weight, are obtained at the outlet from the first separator.

Gases leaving the first separator are fed to the throat of the second Venturi tube, at which 800 kg./h. of diluted orthophosphoric acid, having a temperature of about 45° C. are introduced. Exhaust gases from the second separator are conveyed to a plant for the recovery of fluoride compounds.

As many apparently widely different embodiments of this invention may be made without departing from the spirit and scope thereof, it is to be understood that the same is not to be limited to the specific embodiments thereof, except as claimed in the appended claims.

What is claimed is:

1. A process for the manufacture of superphosphoric acid by direct heat exchange comprising establishing an ascending stream of gaseous drying medium in a vertical conduit, the initial temperature of said stream ranging from about 250° to 1100° C., imparting to said stream a speed ranging from about 20 to 100 m./sec. in a narrowing neck disposed above said conduit; introducing an aqueous solution of orthophosphoric acid into said stream at the level of the said neck, the concentration of said orthophosphoric acid being comprised of between about 30 and 50% by weight of $P_2O_5$, whereby said aqueous solution is subdivided into minute droplets; imparting to said stream a decreasing speed by introducing same into a vertically divergent frusto-conical conduit having an angle of conicity of from 3° to 20°, in which conduit said droplets commence dehydrating and are progressively carried upwardly by the gas stream, until the speed of the gases is such that a fluidized bed of droplets is formed, and wherein dehydration continues to the extent that superphosphoric acid is formed, the droplets of superphosphoric acid being carried upwardly by the gaseous stream to the top of the divergent conduit; and thence separating the gaseous stream and the droplets of superphosphoric acid.

2. The process of claim 1, wherein the gaseous medium is air.

3. The process of claim 1, wherein the gas has an initial temperature of between about 550° and 700° C.

4. The process of claim 1, wherein the speed of the gas stream is from between about 50 and 70 meters per second.

5. The process of claim 1, wherein the content of $P_2O_5$ in the aqueous solution of orthophosphoric acid is approximately 45% by weight of $P_2O_5$.

References Cited

UNITED STATES PATENTS 3,104,947 9/1963 Switzer et al. ---------- 23—165

FOREIGN PATENTS 1,399,421 5/1965 France.
1,050,813 12/1966 Great Britain.

HERBERT T. CARTER, Primary Examiner

U.S. Cl. X.R.

159—16; 23—276